(12) United States Patent
Dannawi et al.

(10) Patent No.: US 7,992,357 B2
(45) Date of Patent: Aug. 9, 2011

(54) SAFETY DEVICE FOR USE WITH PRESTRESSING CABLES

(75) Inventors: Marwan Dannawi, La Chapelle sur Erdre (FR); Pierre Brevet, Bouaye (FR)

(73) Assignees: Ecole Centrale de Nantes, Nantes (FR); Laboratoire Central des Ponts et Chaussees, Paris (FR)

( * ) Notice: Subject to any disclaimer, the term of this patent is extended or adjusted under 35 U.S.C. 154(b) by 1229 days.

(21) Appl. No.: 10/512,890

(22) PCT Filed: Apr. 29, 2003

(86) PCT No.: PCT/FR03/01351
§ 371 (c)(1), (2), (4) Date: Jul. 22, 2005

(87) PCT Pub. No.: WO03/093581
PCT Pub. Date: Nov. 13, 2003

(65) Prior Publication Data
US 2006/0010814 A1    Jan. 19, 2006

(30) Foreign Application Priority Data
Apr. 29, 2002 (FR) .................................. 02 05353

(51) Int. Cl.
*E04C 5/08* (2006.01)
*E01D 19/16* (2006.01)
(52) U.S. Cl. ........................................ 52/223.14; 14/22
(58) Field of Classification Search ............... 52/223.14, 52/223.1; 14/22; 254/113, 29 A
See application file for complete search history.

(56) References Cited

FOREIGN PATENT DOCUMENTS
EP          0 824 167      2/1998
WO          WO 00/08264  *  2/2000

* cited by examiner

*Primary Examiner* — Michael Safavi
(74) *Attorney, Agent, or Firm* — Young & Thompson

(57) ABSTRACT

Safety equipment for use with prestressing cables as used in civil engineering and building structures, the safety equipment having two principle parts adapted to fit over a cable at a point where the cable interfaces with anchoring members or walls, the safety equipment configured to take over from original anchoring elements in the event of a rupture of the cable.

9 Claims, 2 Drawing Sheets

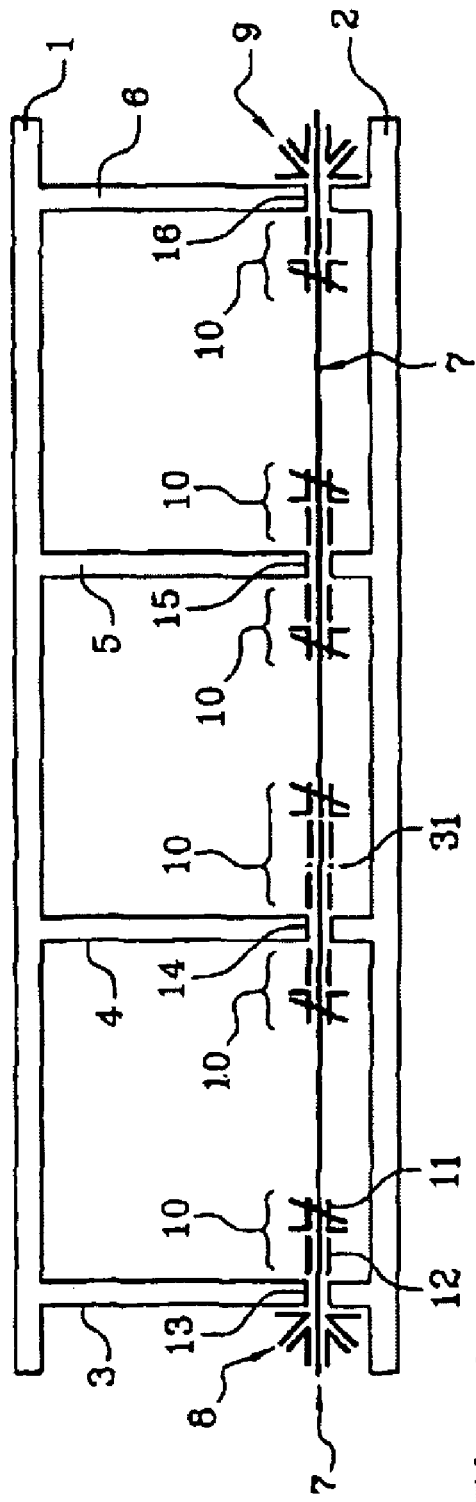
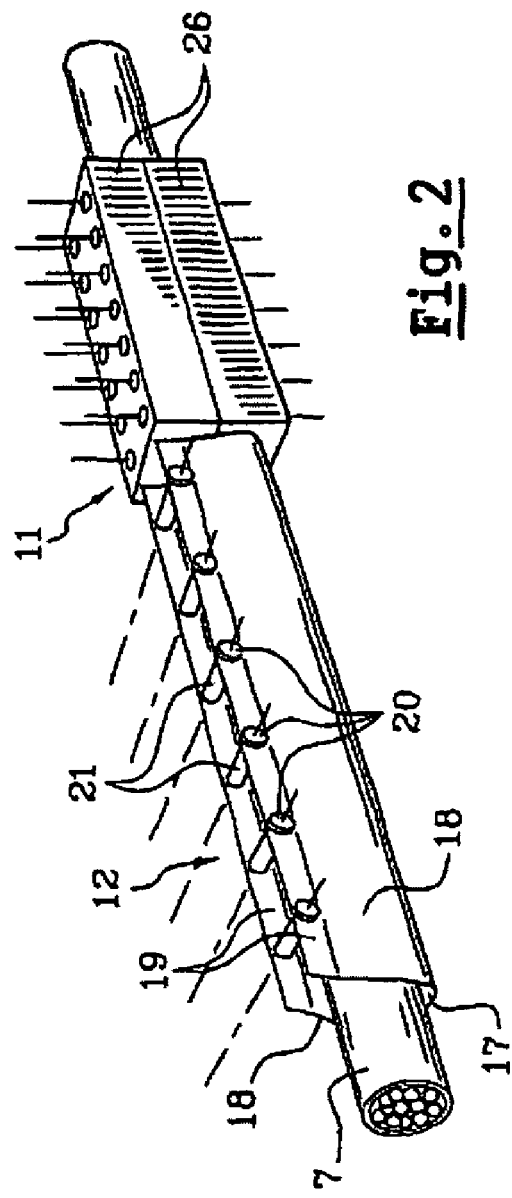

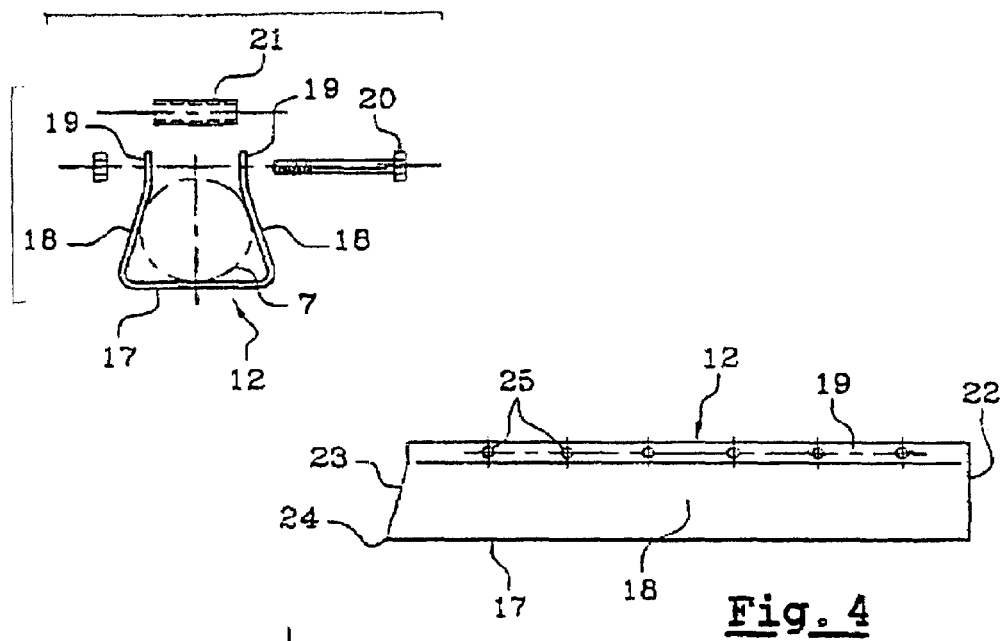
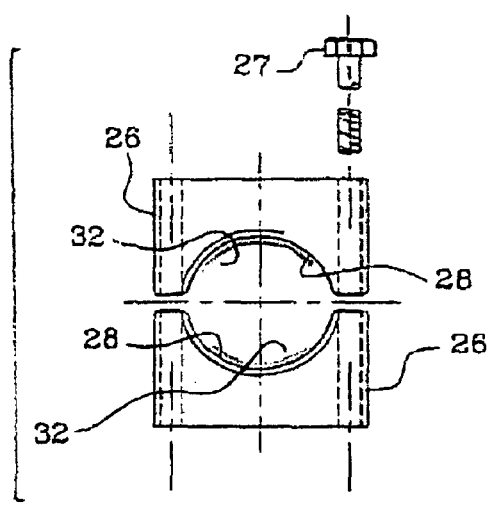
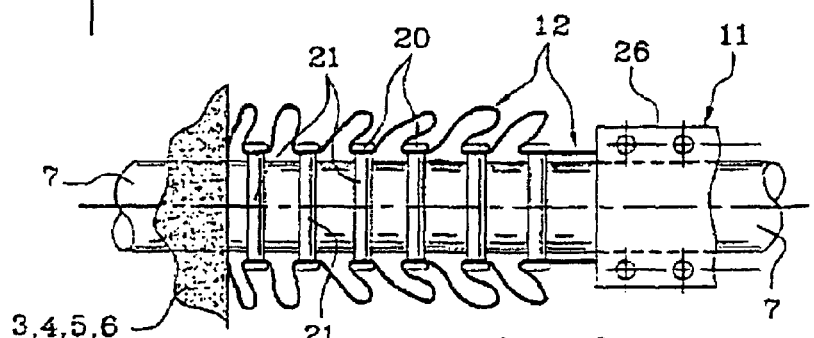

SAFETY DEVICE FOR USE WITH PRESTRESSING CABLES

The present invention relates to a method for protecting civil engineering works or others civil engineering structures and building structures including stretched external prestressing cables and/or supporting cables and/or tension rods. It also relates to the safety equipment used for implementing the process.

BACKGROUND OF THE INVENTION

The civil engineering works such as bridges, include reinforcements integrated directly to the concrete. They also include external reinforcements, not integrated to the concrete properly speaking, formed of big tension cables also called prestressing cables. These cables are stretched between structure elements of the civil engineering works.

These external prestressing cables may have lengths of several tens of meters. They are stretched and anchored on elements of the civil engineering works which serve as stops and they may also run through other elements of the civil engineering works such as walls or partitions.

The ends of these cables include anchoring means which enable to keep the initial prestressing tension.

These cables are generally well protected but it is not seldom to notice ruptures whereof the causes are multiple: corrosion, overload, fatigue.

The sudden rupture of a cable may cause major disorders on its close environment, i.e. the structure of the civil engineering works and also the neighboring cables for instance.

Between the anchoring members, the cables running through the elements of the civil engineering works; orifices are provided in these elements or walls and the cables are guided by the reservation tubes dedicated to that end during the construction.

The present invention offers a method which enables to prevent the consequences of accidental ruptures of these cables.

SUMMARY OF THE INVENTION

The protection method according to the invention consists in installing at the mouthpiece of each passage orifice of the cable in the structure element, a safety equipment which is arranged for degrading irreversibly and quasi instantly, the energy released by the relaxed cable when ruptured.

This safety equipment somehow takes over from the primary anchorings of the cable and it may be provided for absorbing total relaxation of the cable, thereby mastering each section of the broken cable.

This method consists in fact in positioning on the cable(s), a safety equipment especially designed for ancient existing civil engineering works, and in particular for dressing the cable(s) by dint of an equipment which comprises parts liable to be assembled in situ at a later stage, for enveloping the cable or extend of both sides symmetrically.

According to a variation, the method consists in positioning the equipment or at least one portion of said equipment, simultaneously to the realization of the civil engineering works and to the installation of the corresponding cable, by mounting said equipment on the cable of both sides of each orifice.

The invention relates also the safety equipment used for implementing the protection method, which equipment is composed: —of a part attached to the cable, distally from the mouthpiece of the passage orifice of said cable in the structure element and, between this part and said mouthpiece, of at least one energy absorption device, whereof the length is suited to the lengthening of the cable where tension is applied thereto, and whereof the absorption capacity is programmed to enable the operation thereof with a controlled load having a maximum value smaller than the adherence load and friction rupture of the attachment of said part on the cable.

Still according to the invention, the part attached to the cable is composed of two semi-shells or jaws made of steel, aluminium or composite material; these semi-shells are assembled and clamped on the cable by any appropriate means, screws, bolts and the clamping pressure is adapted to avoid damaging components of the cable, i.e. its sheath, strands and slurries.

According to another arrangement of the invention, the internal surface of the shells or jaws, in contact with the periphery of the cable, is rough for better anchoring thereof to said cable; this internal surface may for instance include scores obtained by machining a thread whereof the pitch is for instance 1 to 3 mm.

Still according to the invention, the energy absorption device corresponds to the device object of the patent application FR-02 05105. This device detailed thereunder is in the form of an elongated metal gutter whereof the section is in the form of a U or an omega, in order to wrap partially the cable, and the flanks of this gutter are connected together by tension rods and are maintained apart by spacers.

Still according to the invention, the energy absorption device consists, as in the patent application aforementioned, of a folded metal sheet including a base and two lateral sides slightly convergent whereof the upper rims, which are parallel to one another, are fitted with orifices for letting tension rods through.

According to another arrangement of the invention, the lateral sides of this absorbing device are in the form of a trapezoid and its end plane describes an angle with the plane of its portion forming the base, in order to initiate gradually the deformation of the absorbing device, starting from the ridge of said base.

According to a variation, the absorbing device is in the form of a structure whereof the section is closed or in the form of any other structure enabling calibrated energy absorption.

BRIEF DESCRIPTION OF THE DRAWINGS

The invention will be detailed further using the following description and the appended drawings, given for exemplification purposes, wherein:

FIG. 1 represents, schematically, a portion of civil engineering works made of armoured concrete and an external stretched prestressing cable, protected by the method according to the invention;

FIG. 2 represents the safety equipment mounted on a cable;

FIG. 3 represents, seen from the end thereof, the energy absorbing device and the means which enable the assembly thereof on the cable;

FIG. 4 represents, laterally, the energy absorbing device;

FIG. 5 represents, at enlarged scale, both semi-shells or jaws intended to be fixed to the cable;

FIG. 6 represents, seen from below, the energy absorbing device deformed further to a ruptured cable.

DETAILED DESCRIPTION OF THE PREFERRED EMBODIMENTS

FIG. 1 shows very schematically, a portion of civil engineering works such as for instance a portion of bridge, which includes an upper floor 1, a lower floor 2 and structure elements composed for instance of walls marked 3, 4, 5 and 6.

A cable 7 serving as an external prestressing cable is stretched between the walls 3 and 6, maintained in stretched condition by anchoring means 8 and 9 disposed at the walls 3 and 6 respectively, which serve as stops.

On this cable 7, there can be noted on each side of the walls an equipment 10 which corresponds to the safety equipment according to the invention.

This safety equipment 10, detailed on the following figures, comprises a part 11 forming the hammer, attached to the cable 7 and a device 12 enabling to absorb the energy.

The cable 7 runs through the different walls 3, 4, 5 and 6. It is guided into orifices 13, 14, 15 and 16 and in particular into reservation tubes provided during the construction of the works in the walls 3, 4, 5 and 6. There can be noted, FIG. 1, that safety equipments 10 are displaced at each mouthpiece of the orifices.

Thus, in case of ruptured cable 7, regardless of the place, between the walls 3 and 4, or 4 and 5, or 5 and 6, the safety equipments 10 play a part for absorbing the energy resulting from the relaxed cable.

FIG. 2 shows a safety equipment composed of a part 11 attached to the cable 7 and an absorbing device 12 which clamps said cable. This absorbing device corresponds to that which was an object of the patent application FR-02 05105.

This device 12 is detailed thereunder. It is in the form of a U- or omega-shaped gutter. This gutter is shaped from a folded metal sheet. It comprises a base 17 and lateral walls 18. The base 17 is flat, rectangular in shape; the lateral walls 18 are also flat and include at their upper section, a rim 19. This rim 19 is provided to enable the installation of tension rods 20 which connect said walls, closing the gutter on the cable 7. These tension rods 20 are formed of bolts for instance and the space between the rims 19 of the walls 18, is established by means of spacers 21 in the form of tubes, mounted on said tension rods 20.

FIG. 3 shows the absorbing device 12 during installation on the cable 7. This absorbing device has a section which is in the form of a U or an omega, enveloping the cable 7. The walls 18 are slightly tilted with respect to the base 17, tightening upwards. The upper rims 19 of the walls 18 enable the installation of the tension rods 20 and their spacing is calibrated by means of tubular spacers 21.

The absorbing device is mounted to slide on the cable 7.

FIG. 4 shows the absorbing device 12 seen laterally. Its lateral walls 18 are in the form of a rectangular trapezoid. On one side, the end 22 of the absorber is perpendicular to the base 17; this end 22 is in contact with the part 11 forming the hammer. The other end 23 of the absorber is tilted, forming with the base 17 an angle smaller than 90° of the order of 80° for instance.

This end 23 corresponds to the end which is in contact with the mouthpiece letting through the cable at the walls 3, 4, 5 or 6. In fact, it is the ridge 24 of the base 17 which is in contact with the walls, in order to initiate gradually the deformation of the absorber during operation.

The tilt of this end 23 enables gradual increase in the deformation load of the absorber 12, when the cable breaks off, and to crush the absorber by the part 11 which serves as a hammer, against the corresponding wall.

There can be noted, still on FIG. 4, disposed in the upper rim 19 of the lateral walls 18, the orifices 25 which let through the tension rods 20. These orifices 25 are for instance spaced regularly over the length of the absorbing device.

This absorber 12 is made out of a stainless steel sheet or any other metal, composite or plastic material. For informative purposes, this sheet may have a thickness of the order of 3 to 4 mm, in the form of a gutter to envelope a cable whereof the diameter is of the order of 90 mm for instance.

The length of the absorber is chosen relative to the variation in length of the cable to be controlled when releasing it.

The deformation load of the absorber is chosen to be smaller than the fastening load of the part 11 on the cable 7.

This cable 7 is generally composed of several strands enveloped with a sheath of thermoplastic material.

The part 11, as represented FIG. 5, is composed of two semi-shells 26 assembled by screws or bolts 27. These semi-shells 26 have a cylindrical bore whereof the internal surface 28 is preferably rough for better adherence to the periphery of the cable 7. This internal surface 28 includes for instance scores corresponding to a kind of internal thread whereof the pitch ranges between 1 and 3 mm for instance; this thread enables correct anchoring of each semi-shell on the cable, and to avoid any risks of slipping below a load value smaller than that which corresponds to the operation of the absorber 12.

Screws or bolts 27 run both semi-shells 26; their number and the clamping torque are determined in order to obtain an adherence load on the cable which is vastly greater than the load necessary to deform the absorbing device 12.

The part 11 may be made of steel, aluminium or of composite material, moulded or not.

FIG. 6 shows the absorbing device 12 seen from above, deformed under the action of the part 11, between the latter and one of the walls 3, 4, 5 or 6, after rupture of the cable 7. The absorber 12 deforms, by successive folds, each fold being delineated by the tension rods 20.

According to the particular requirements, one may also provide the installation of several absorbers 12, displaced in series on the cable 7, and separated by a free transition part 31 on the cable, in the form of a washer for instance.

Each absorber 12 may have an absorption capacity of the variation in length of the cable corresponding to the length of this cable between two adjacent walls. To absorb an elongation variation of the cable whereof the length corresponds to double the space between two walls, one may provide the installation of two absorbing devices.

Quite often, the space between the cables is very small and the access relatively cumbersome as well, the form of a gutter of these absorbing devices enables the installation thereof on of the cables of finished civil engineering works.

This form of gutter for the absorber 12 facilitates its assembly on the different cables and its fixation by tension rods 20 is relatively simple also. The rims 19 are clamped with a torque calibrated on the spacers 21, and not on the cable.

Similarly, the installation of the part 11 which serves as a hammer is rendered possible by the use of two semi-shells 26, one being run below the cable and the other positioned on the cable, both assembled by the screws or bolts 27.

However, this safety equipment may also be mounted originally on the cables 7. In such a case, one may also use an absorbing device of section closed for instance made of metal material, composite material or plastic material.

This safety equipment may also be used on any type of stretched cable such as for instance suspension posts, stay cables, supporting cables, anchoring tension rods. As the case may be, it may appear as detailed above in the form of a gutter enveloping the cable or in the form of absorbing devices displaced on both sides of the cable, symmetrically.

This safety equipment is also suitable for any type of cable and in particular multi-wire cables, multi-strand cables, sheathed cables and injected or not with cement slurries or others.

The invention claimed is:

1. A safety equipment for protecting a civil engineering work with an external pre-stressing cable guided into an orifice through an element or wall of said civil engineering work, the safety equipment comprising:
   a hammer part (11) attached to the cable (7) and spaced from a mouth of the orifice; and
   at least one energy absorption device (12) interposed on the cable (7) between the hammer part (11) and the mouth of the orifice and having an absorption capacity configured to enable the absorption device to undergo a deformation upon application of a controllable load exerted by the cable upon an end of the device (12) via the hammer part (11),
   wherein a maximum value of the controllable load is smaller than a fastening load of said hammer part (11), said fastening load being a load exerted by the cable upon the hammer part (11) causing the hammer part (11) to become unfastened from said cable, and
   wherein said deformation irreversibly and rapidly degrades an energy of the cable released with the application of the controllable load.

2. The safety equipment according to claim 1, wherein the hammer part (11) attached to the cable (7) comprises two semi-shells (26) assembled by at least one fastener.

3. The safety equipment according to claim 2, wherein the at least one fastener comprises any one of a group consisting of screws and bolts.

4. A safety equipment for protecting civil engineering work with an external pre-stressing cable guided into an orifice through an element or wall of said civil engineering work, the safety equipment comprising:
   a hammer part (11) attached to the cable (7) and spaced from a mouth of the orifice; and
   at least one energy absorption device (12) interposed on the cable (7) between the hammer part (11) and the mouth of the orifice and having an absorption capacity configured to enable the absorption device to undergo a deformation upon application of a controllable load exerted by the cable upon the device (12) via the hammer part (11),
   wherein the energy absorption device comprises an elongated metal gutter with lateral sides (18),
   wherein a maximum value of the controllable load is smaller than a fastening load of said hammer part (11), said fastening load being a load exerted by the cable upon the hammer part (11) causing the hammer part (11) to become unfastened from said cable, and
   wherein said deformation irreversibly and rapidly degrades an energy of the cable released with the application of the controllable load.

5. The safety equipment according to claim 4, wherein the elongated metal gutter of the energy absorbing device (12) is formed of a folded metal sheet, the folded metal sheet having a base (17) and the lateral sides (18) extending from the base.

6. The safety equipment according to claim 4,
   wherein the lateral sides (18) of the absorbing device (12) are each formed as a rectangular trapezoid having a first end (22), a second end (23), and a base portion (17) including a ridge (24),
   the first end (22) being perpendicular to the base portion (17), and
   the second end (23) being tilted at an angle on the order of 80° with respect to said base portion (17) in order to initiate gradually said deformation of the absorbing device, the deformation starting from the ridge (24) of said base portion (17).

7. The safety equipment according to claim 4, wherein the hammer part (11) attached to the cable (7) comprises two semi-shells (26) assembled by at least one fastener.

8. The safety equipment according to claim 6, wherein the first end (22) is in contact with the hammer part (11).

9. The safety equipment according to claim 5, wherein the lateral sides (18) have upper rims (19), the upper rims fitted with orifices (25) and tension rods (20) extending through the orifices and across a space between the upper rims to connect the lateral sides (18) together, the space between the upper rims being maintained by spacers (21) centered on said tension rods.

\* \* \* \* \*